(12) United States Patent
Ruyten et al.

(10) Patent No.: US 9,864,196 B2
(45) Date of Patent: *Jan. 9, 2018

(54) HEAD-UP DISPLAY SYSTEM WITH A DRIVE MECHANISM TO MOVE A COVER TO PROTECT A COMBINER

(71) Applicant: Jabil Circuit, Inc., St. Petersburg, FL (US)

(72) Inventors: Henricus Marie Ruyten, Gumpoldskirchen (AT); Christoph Potakowskyj, Vienna (AT)

(73) Assignee: Jabil Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,024

(22) Filed: Jun. 10, 2015

(65) Prior Publication Data

US 2015/0362732 A1   Dec. 17, 2015

(30) Foreign Application Priority Data

Jun. 11, 2014 (EP) .................................. 14171942

(51) Int. Cl.
*G02B 27/14* (2006.01)
*G02B 27/01* (2006.01)

(52) U.S. Cl.
CPC .... *G02B 27/0149* (2013.01); *G02B 2027/015* (2013.01); *G02B 2027/0154* (2013.01)

(58) Field of Classification Search
CPC ...... G02B 2027/0154; G02B 2027/015; G02B 27/0149; B60K 2350/405; B60R 2011/0082; B60R 2011/0092

(Continued)

(56) References Cited

U.S. PATENT DOCUMENTS 8,454,073 B2   6/2013   Grandel et al.
8,619,369 B2   12/2013  Box et al.

(Continued)

FOREIGN PATENT DOCUMENTS

DE   430716 C      6/1926
EP   2477058 A2    7/2012

(Continued)

OTHER PUBLICATIONS

Norton, R.L. "Design of Machinery—Hoekens Linkage", XP055034377, p. 134, Jan. 1, 2008.

(Continued)

*Primary Examiner* — Mahidere Sahle
(74) *Attorney, Agent, or Firm* — Volpe and Koenig, P.C.

(57) ABSTRACT

A head-up display system includes housing, a combiner to display information in an operating position and a cover to protect the combiner. The combiner moves between the operating position and a storage position. The cover moves between an open position and a closed position to protect the combiner in its storage position with the cover in its closed position. The system includes a drive to move the cover between its open and closed positions. The drive includes a main lever and a support lever that is pivoted with a moving end to the main lever and with a fixed end to the housing. The main lever is pivoted with a cover end to the cover and with a driver end to a rotational drive to drive an essential linear movement of the cover end of the main lever during the movement of the cover between its open and closed positions.

13 Claims, 9 Drawing Sheets

(58) Field of Classification Search
USPC .......................................... 359/13, 629–633
See application file for complete search history.

(56) References Cited

U.S. PATENT DOCUMENTS

| | | |
|---|---|---|
| 2008/0239523 A1 | 10/2008 | Beck et al. |
| 2011/0141702 A1 | 6/2011 | Kissel et al. |
| 2013/0100533 A1 | 4/2013 | Potakowskyj et al. |
| 2013/0201541 A1* | 8/2013 | Sasaki ................ G02B 27/0149 359/221.3 |
| 2014/0177064 A1* | 6/2014 | Sugiyama .......... G02B 27/0101 359/630 |
| 2014/0368097 A1* | 12/2014 | Yomogita .......... G02B 27/0149 312/23 |

FOREIGN PATENT DOCUMENTS

| | | | |
|---|---|---|---|
| JP | WO2012169557 | * | 12/2012 |
| WO | 2007137998 A1 | | 12/2007 |
| WO | 2012169557 A1 | | 12/2012 |
| WO | 2013004611 A1 | | 1/2013 |

OTHER PUBLICATIONS

Tielen, Viktor et al. "Three-Dimensional Glass Monolithic Micro-Flexure Fabricated by Femtosecond Laser Exposure and Chemical Etching" Micromachines, vol. 5, No. 3, XP055152830, pp. 697-710, Jan. 1, 2014.

* cited by examiner

HEAD-UP DISPLAY SYSTEM WITH A DRIVE MECHANISM TO MOVE A COVER TO PROTECT A COMBINER

CROSS REFERENCE TO RELATED APPLICATION

This application claims the benefit of European Patent Application No 14171942.7 filed on Jun. 11, 2014, which is incorporated by reference as if fully set forth.

FIELD OF INVENTION

The present invention concerns a head-up display system usable for traffic applications such as in automobiles according to the preamble of claim 1.

BACKGROUND

A head-up display or HUD is a transparent display panel that presents information to a user without requiring users to look away from a preferred viewing direction. The origin of the name stems from a pilot being able to view information with the head positioned "up" and looking forward, instead of angled down looking at lower instruments. Although they were initially developed for military aviation, HUD systems are nowadays used in commercial aircraft, automobiles, and other applications.

For example a driver can view traffic and the road in front of the vehicle through the transparent panel of a HUD system that is attached to a dashboard close to a windshield of the vehicle. A typical HUD system comprises a combiner, a projector and a video data source such as a computer. The combiner is typically an angled flat piece of glass or plastic located directly in front of the viewer that redirects the projected image from the HUD projector in such a way as to see and therefore combine the field of view and the projected image at the same time. Combiners may have special coatings that reflect the monochromatic light projected onto it from the projector unit while allowing all other wavelengths of light to pass through. In some optical layouts combiners may also have a curved surface to refocus the image from the projector. A combiner is comparable to a semi-transparent mirror. The HUD projector is usually mounted above or below the combiner. The computer provides the interface between the HUD projector and the systems or data to be displayed and generates the imagery and symbology to be displayed by the HUD projector towards the combiner which then further projects the images to the user.

Combiner positioning mechanisms for a HUD system which can be moved between a storage position and an operating position are known in the art. For example such a combiner is disclosed in document WO 2013/004611 A1. In this known design the combiner is stored in a housing when in a storage position and protected by a cover in its closed position. A drive mechanism of the HUD moves the combiner around a combiner axis from the storage position to the operating position to project out of the vehicle's dashboard. A planetary gearing is used to at the same time turn and slide the cover from its open position into its closed position. The housing of this known HUD system comprises a substantial volume as the cover in its open position elongates the combiner in its operating position into the housing. This makes it difficult to design this HUD system into a dashboard as a lot of other devices have to be fed into it as well and volume available for the housing of the HUD is restricted.

The document U.S. Pat. No. 8,619,369 B2 discloses a HUD system with a combiner linear movable in a direction perpendicular to the surface of the dashboard from its storage position into its operating position and with a cover pivoted around a cover axis to move the cover from its closed position to its open position. The housing of this known HUD system reaches quite deep into the dashboard what makes it difficult to design this HUD system into a dashboard.

The aim of the invention is to provide a HUD system that overcomes the disadvantages of the HUD systems known in the art. This problem is solved by a head-up display system with a cover according to the preamble of claim 1 with the features of the characterizing part of claim 1. The subjects of the dependent claims concern further advantageous embodiments of the invention.

SUMMARY

According to the invention a head-up display system comprises a drive mechanism to move the cover between its open position and its closed position, which drive mechanism comprises a main lever and a support lever that is pivoted with a moving end to the main lever and with a fixed end to the housing, wherein the main lever is pivoted with a cover end to the cover and with a driver end to a rotational drive mechanism to drive an essential linear movement of the cover end of the main lever during the movement of the cover between its open position and its closed position. This drive mechanism with the main lever and the support lever is a mechanically simple and robust solution that enables to move the cover in a linear movement between its closed position and its open position. This enables a flat housing of the HUD that is easy to design into a dashboard.

Particularly advantageous is to arrange the main lever and the support lever of the drive mechanism essentially in a parallel plane to the cover in its open position and its closed position. This enables to furthermore reduce the volume of the housing and eases to design the HUD into a dashboard of a car or airplane.

A further advantageous alternative of the invention is realized in a way that the cover is slideable along a curved guiding member in a guiding direction between the open position and the closed position of the cover while the pivot to connect the main lever with the cover is slidable in essentially a vertical direction to the guiding direction. This ensures to avoid side forces causing friction between the guiding member and the cover and enables a smooth movement of the cover without situations of jam.

In a further embodiment of the invention the curved guiding member is built to lower the position of the cover at the beginning of the movement from the closed position to the open position and after that to move the cover in an essential linear movement. This enables a uniform surface of the dashboard with the cover in its closed position and an overall flat housing of the HUD system.

Particularly advantageous is the driver mechanism with a motor driven gearwheel meshing with a lever gearwheel with an area of their perimeter without meshing to disconnect the motor driven gearwheel from the lever gearwheel. This has the advantage that the driver mechanism only needs a single motor to drive the cover and the combiner into their different positions.

In another preferred design of the HUD according to the invention the motor driven gearwheel comprises a further curved guiding member on its end face to guide a driver pin along a curve which driver pin engages with the combiner to move the combiner between its operating position and its storage position wherein the guiding member comprises a degressive curve to enable self-locking of the combiner in the operating position. This design has the advantage that the combiner is very robust fixed in its operating position to avoid vibrations of the combiner and distortions of the information projected on the combiner.

Advantageously the HUD system comprises a drive mechanism with the distance from the center of the lever gearwheel to the driver end of the main lever is L and the distance from the center of the lever gearwheel to the fixed end of the support lever is 2 times L and the distance from the driver end of the main lever to the moving end of the support lever is 2.5 times L and the distance from the moving end of the support lever to the cover end of the mail lever is 2.5 times L and the length of the support lever from its moving end to its fixed end is 2.5 times L. These particular dimensions enable a linear movement of the cover end of the main lever during the movement of the cover between its open position and its closed position.

Further details and advantages of the combiner positioning device in a head-up display according to the invention will become more apparent in the following description and the accompanying drawings.

DETAILED DESCRIPTION OF THE PREFERRED EMBODIMENTS

Figure 1:
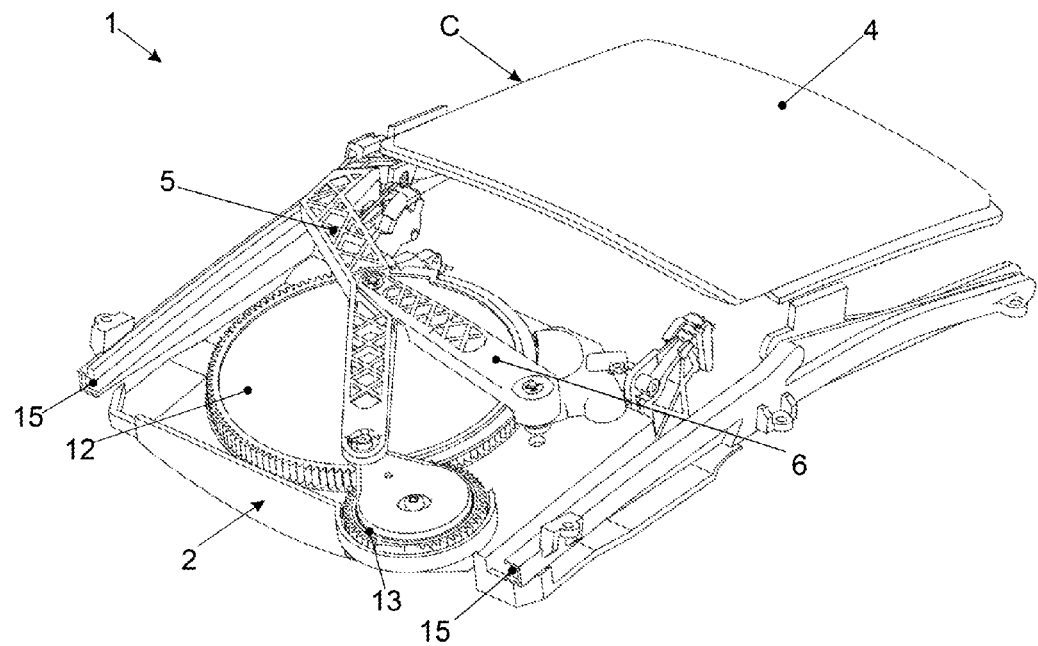
FIG. 1 is a perspective view of relevant parts of a head-up display (HUD) system with the cover in its closed position.
Figure 2:
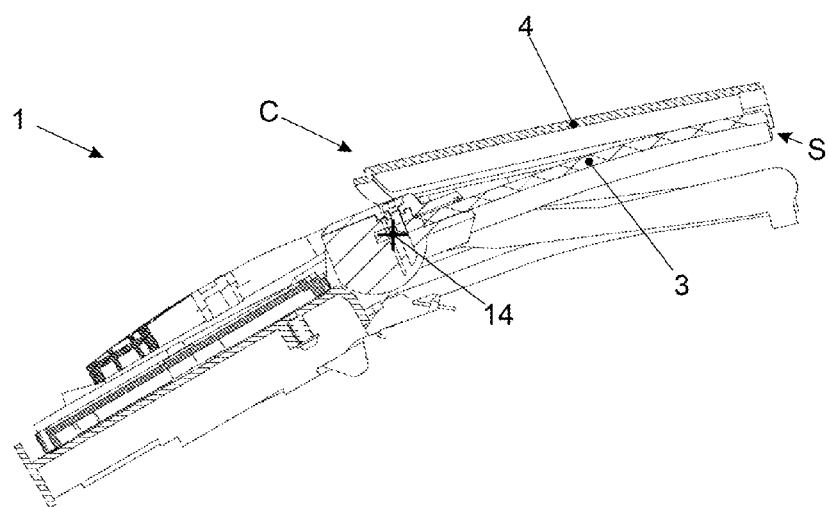
FIG. 2 is a sectional view of the HUD system of FIG. 1 with the cover in its closed position.
Figure 3:
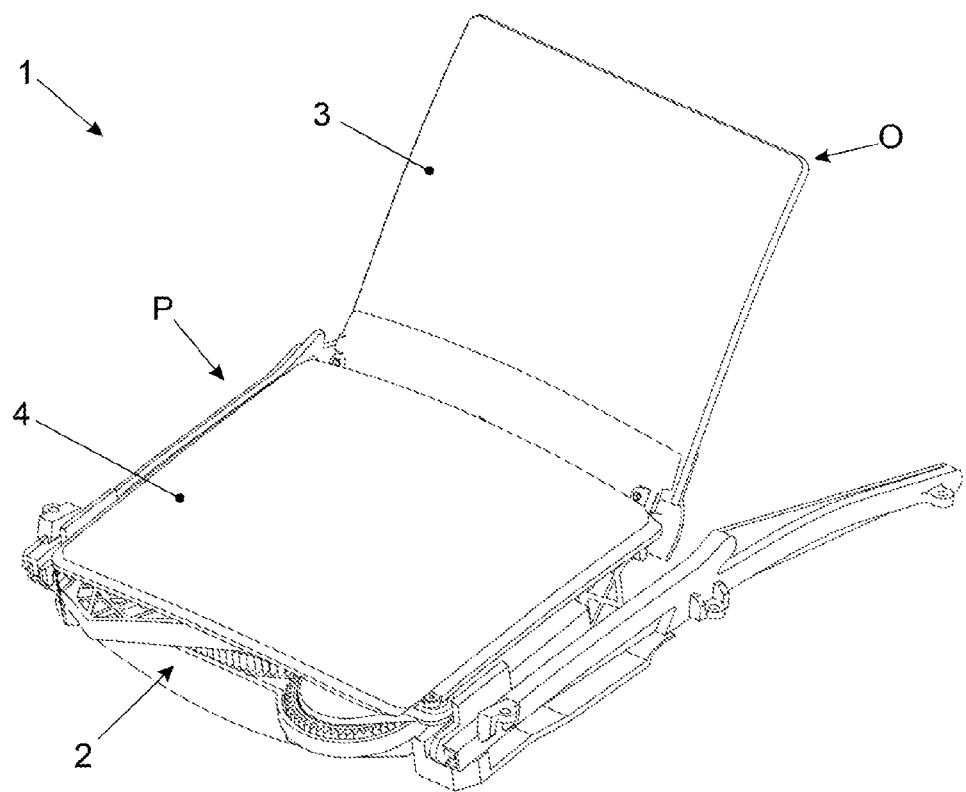
FIG. 3 is a perspective view of relevant parts of the HUD system with the cover in its open position and its combiner in its operating position.
Figure 4:
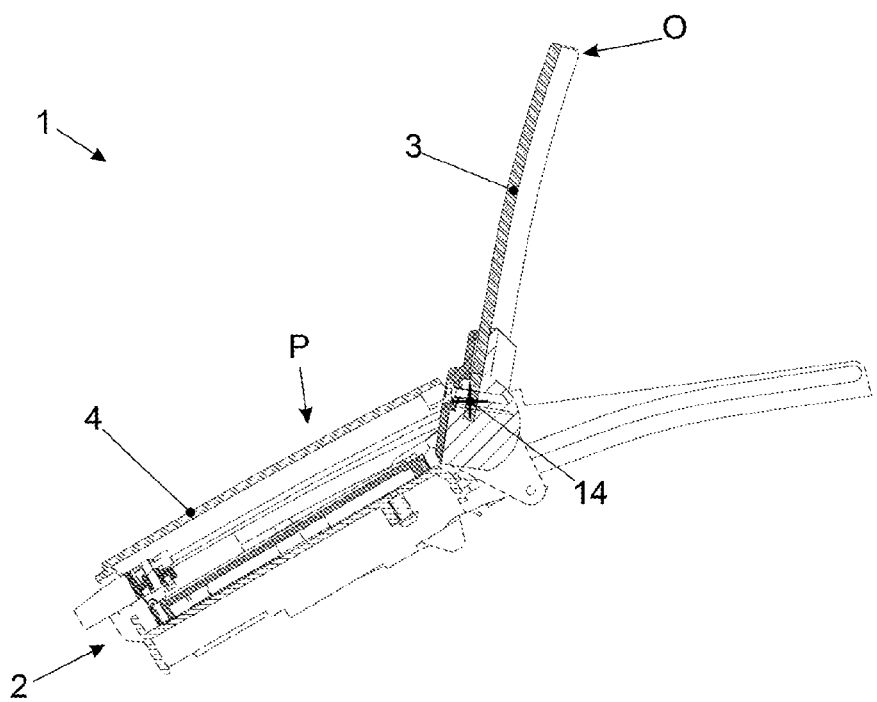
FIG. 4 is a sectional view of the HUD system of FIG. 3 with the cover in its open position and the combiner in its operating position.
Figure 5:
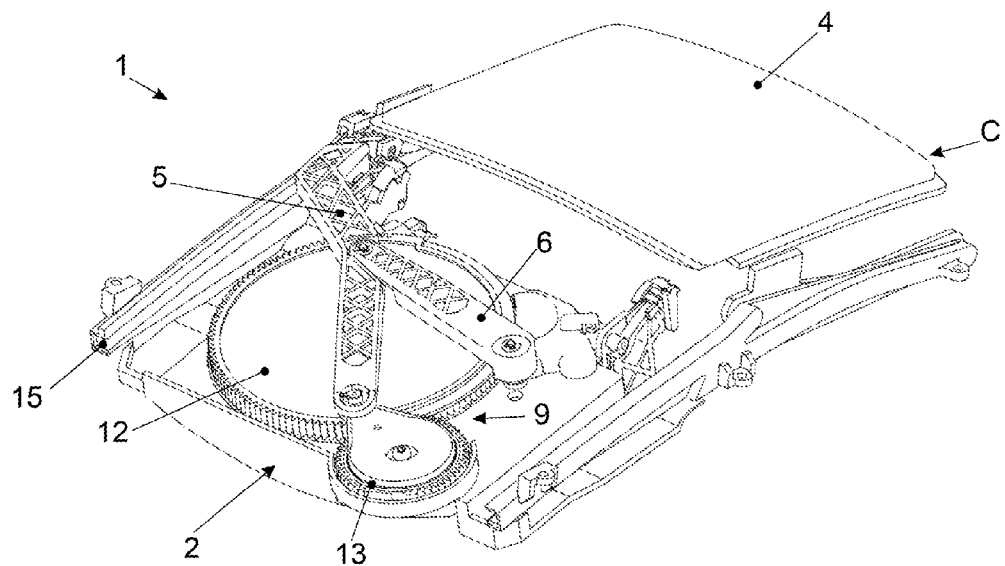
FIG. 5 is another perspective view of relevant parts of the HUD system with the cover in its closed position.

FIG. 1 shows relevant parts of a head-up-display (HUD) system 1 in a perspective view without its protective housing to be integrated within a dashboard of an automobile. The HUD system 1 comprises a drive mechanism 2 to pivot a combiner 3 between a storage position S, symbolized by a cursor S, and an operating position O, symbolized by a cursor O. In storage position S the combiner 3 is folded down or folded in, respectively, into a recess or internal space of the protective housing as shown in FIGS. 1 and 2. During operation of the vehicle the combiner 3 is folded out of the protective housing and set in its operating position O as shown in FIGS. 3 and 4. The combiner 3 is a transparent panel that includes optical coatings that reflect those specific wavelengths that are projected by a HUD projector which is not explicitly shown in the Figures. Also a video data source like a computer that is usually required to project information via the projector on the combiner 3 and thus enable proper function of the HUD system 1 is not shown in the Figures.

The HUD system 1 furthermore comprises a cover 4 to protect the combiner 3 in its storage position S to avoid scratches and dirt on the combiner 3. The drive mechanism 2 moves the cover 3 between a closed position C, symbolized by a cursor C, and an open position P, symbolized by a cursor P. The cover 4 in its closed position C protects the combiner 3 in its stored position S and the drive mechanism 2 first moves the cover 4 from its closed position C into its open position P and after that moves the combiner 3 from its stored position S into its operating position O to enable operation of the combiner 3. FIGS. 5 to 10 show this movement in three steps.

Figure 6:
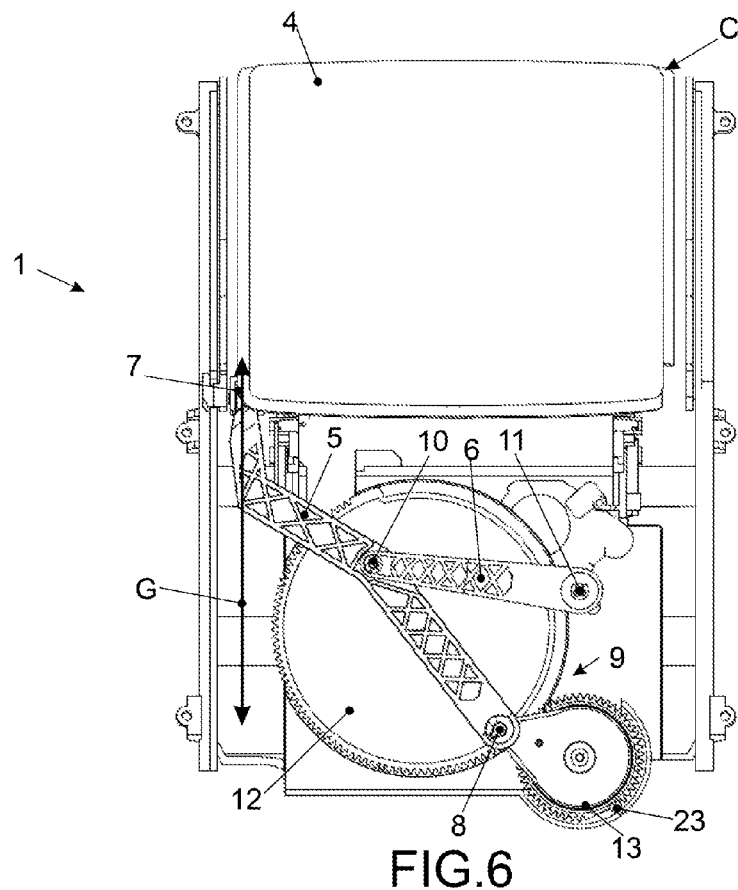
FIG. 6 is a top view of the HUD system of FIG. 5 with the cover in its closed position.

The drive mechanism 2 comprises a main lever 5 and a support lever 6 to transform a rotational movement of a motor, which is not shown in the Figures, of the drive mechanism 2 into a linear movement to move the cover 4 in a guiding direction G between its open position P and its closed position C. The main lever 5 comprises a cover end 7 to pivotable connect with the cover 4 and a driver end 8 to pivotable connect with a rotational drive mechanism 9 of the drive mechanism 2 as shown in FIG. 6. The support lever 6 comprises a moving end 10 to pivotable connect to the main lever 5 and a fixed end 11 to pivotable connect to the housing of the HUD system 1.

Figure 11:
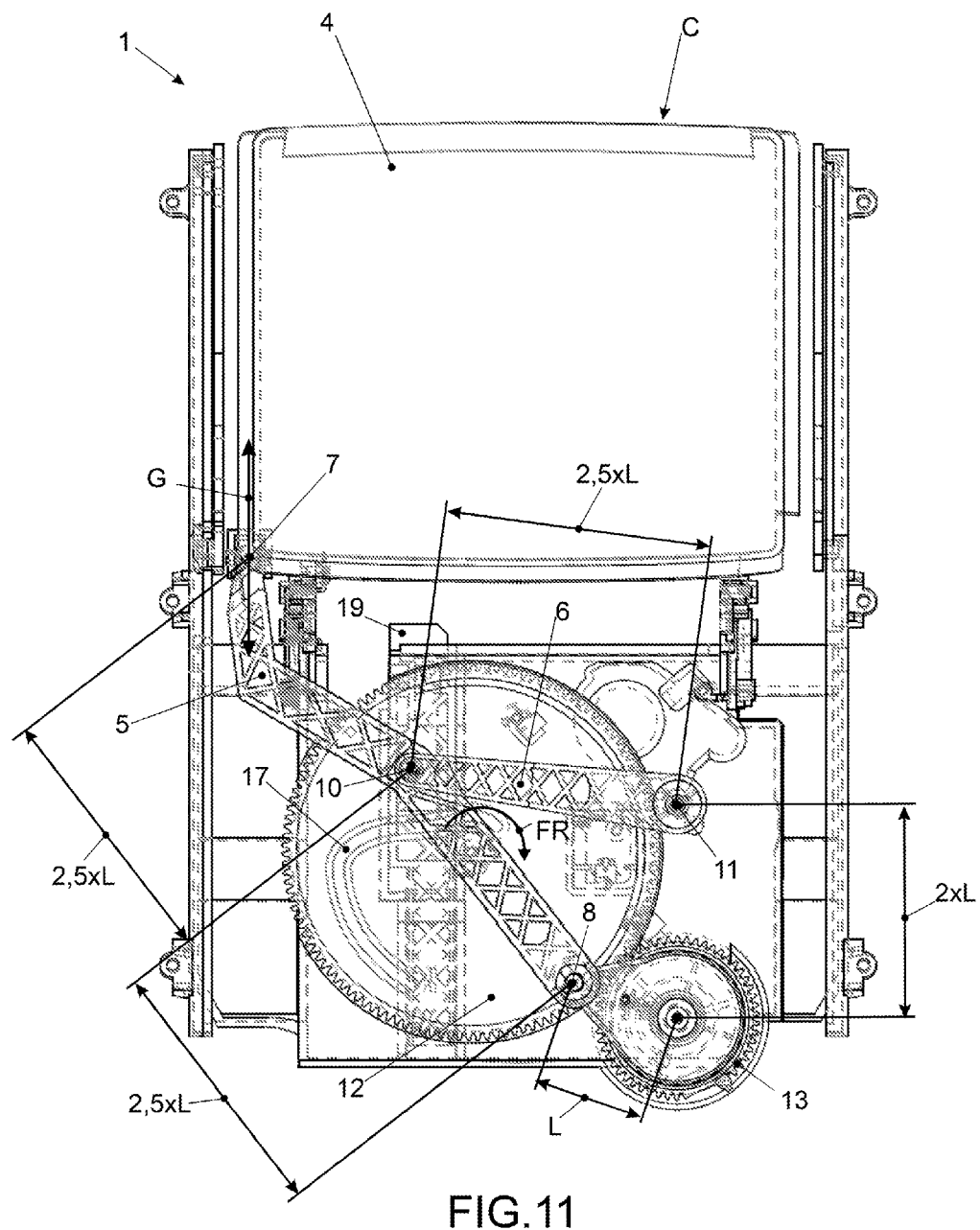
FIG. 11 is a transparent top view of the HUD system of FIG. 6 with the cover in its closed position which displays some of the relevant parts hidden by other in grey shaded lines.

The rotational drive mechanism 9 comprises the motor that drives a motor driven gearwheel 12 meshing with a lever gearwheel 13 which is pivoted with the driver end 8 of the main lever 5. The HUD system 1 is realized with specific length and distance relations as shown in FIG. 11 to enable the transformation of the rotational movement into the linear movement in the guiding direction G. The distance from the center of the lever gearwheel 13 to the driver end 8 of the main lever 5 is L, which represents a specific length like e.g. L=5 centimeters. The distance from the center of the lever gearwheel 13 to the fixed end 11 of the support lever 6 is 2 times L and the distance from the driver end 8 of the main lever 5 to the moving end 10 of the support lever is 2.5 times L and the distance from the moving end 10 of the support lever 6 to the cover end 7 of the mail lever is 2.5 times L and the length of the support lever 6 from its moving end 10 to its fixed end 11 is 2.5 times L. These length and distance relations ensure a substantially linear movement of the cover end 7 of the main lever 5 and the cover 4 in the guiding direction G what enables a smooth transition of the cover 4 between its closed position C and its open position P. The length of L may be varied dependent on the size of the HUD system 1.

The combiner 3 of the HUD system 1 is pivoted between its operating position O and its storage position S around a combiner axis 14. The final angle of the combiner 3 in its operating position O may be adjustable by the user of the automobile to adjust it to the size of the user. The main lever 5 and the support lever 6 of the drive mechanism 2 are essentially in a parallel plane to the cover 4 in its open position P and its closed position C. This enables to reduce the volume of the housing of the HUD system 1 and eases to design the HUD system 1 into a dashboard of an automobile or airplane.

Figure 7:
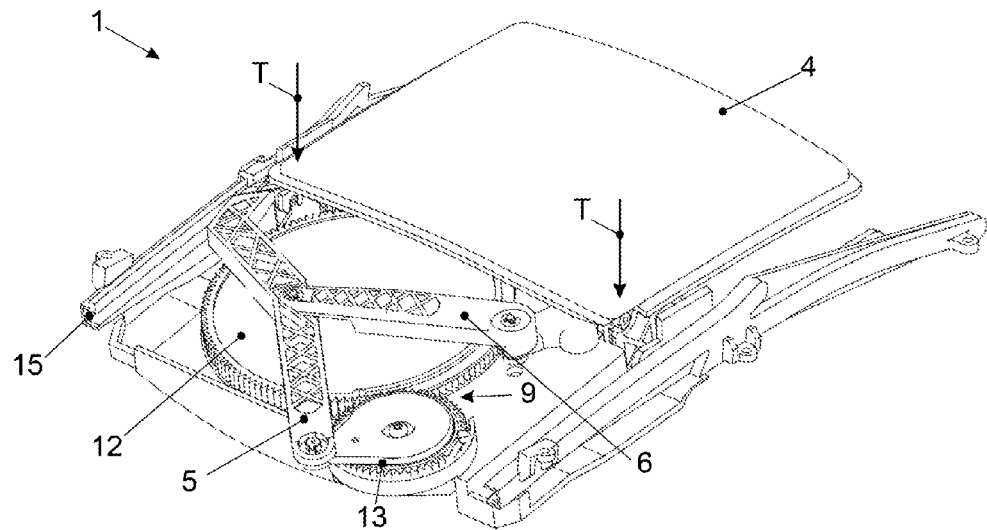
FIG. 7 is another perspective view of relevant parts of the HUD system with the cover in a mid position between the open position and the closed position.
Figure 8:
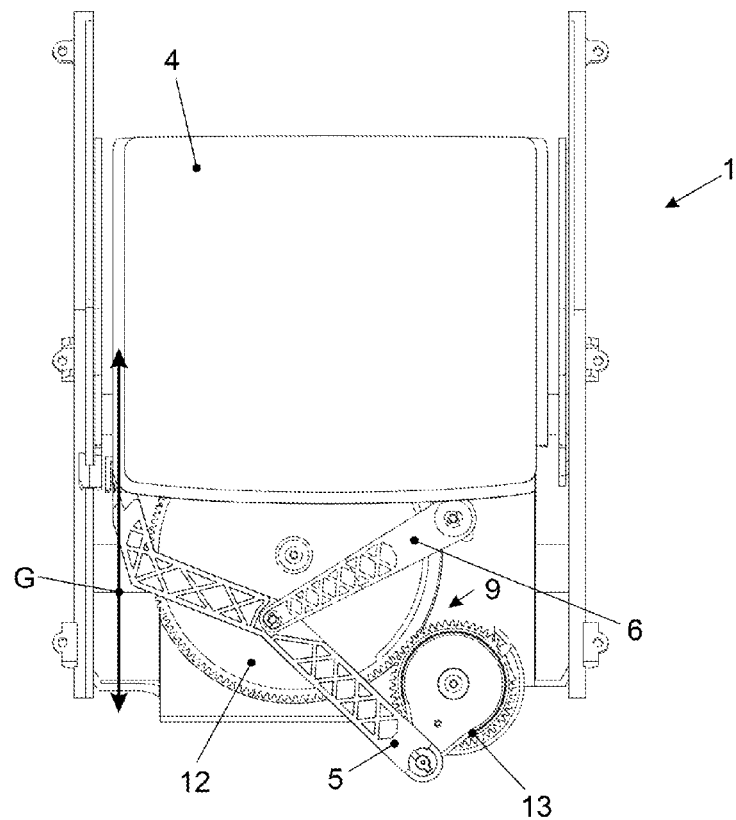
FIG. 8 is a top view of the HUD system of FIG. 7 with the cover in its mid position.
Figure 9:
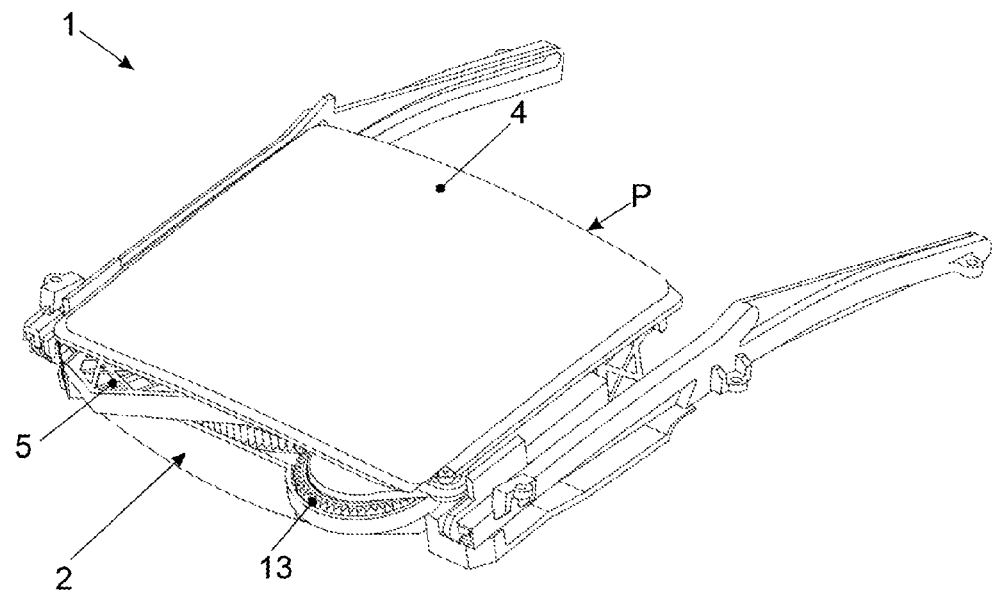
FIG. 9 is another perspective view of relevant parts of the HUD system with the cover in its open position.
Figure 10:
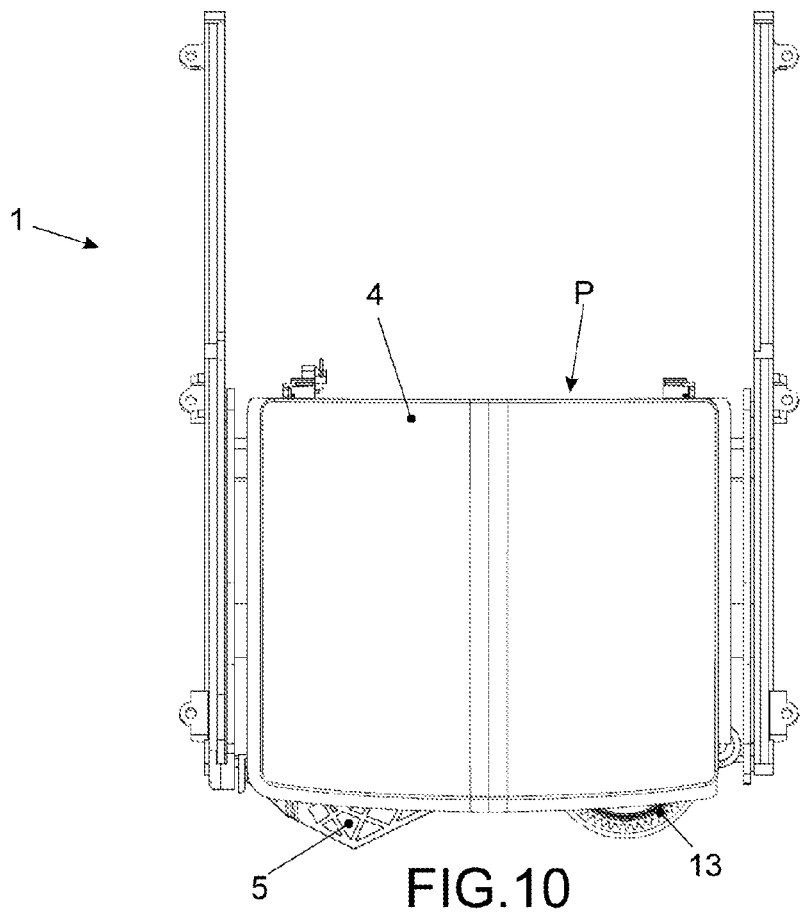
FIG. 10 is a top view of the HUD system of FIG. 9 with the cover in its open position.

The cover 4 is slideable along a curved guiding member 15 in the guiding direction G between the open position P and the closed position C of the cover 4. This has the advantage that the cover 4 is guided in a robust and secure way. The curved guiding member 15 is built to lower the position of the cover 4 at the beginning of the movement from the closed position C to the open position P in a direction T, as shown in FIG. 7, and after that to move the cover in an essential linear movement. This enables a uniform surface of the dashboard with the cover 4 in its closed position C and an overall flat housing of the HUD system 1.

A further substantial advantage of the construction of the HUD system 1 is that the cover 4 is only connected with the cover end 7 of the main lever 5 to the drive mechanism 2. This reduces the number of parts and cost of the HUD system 1.

Figure 12:
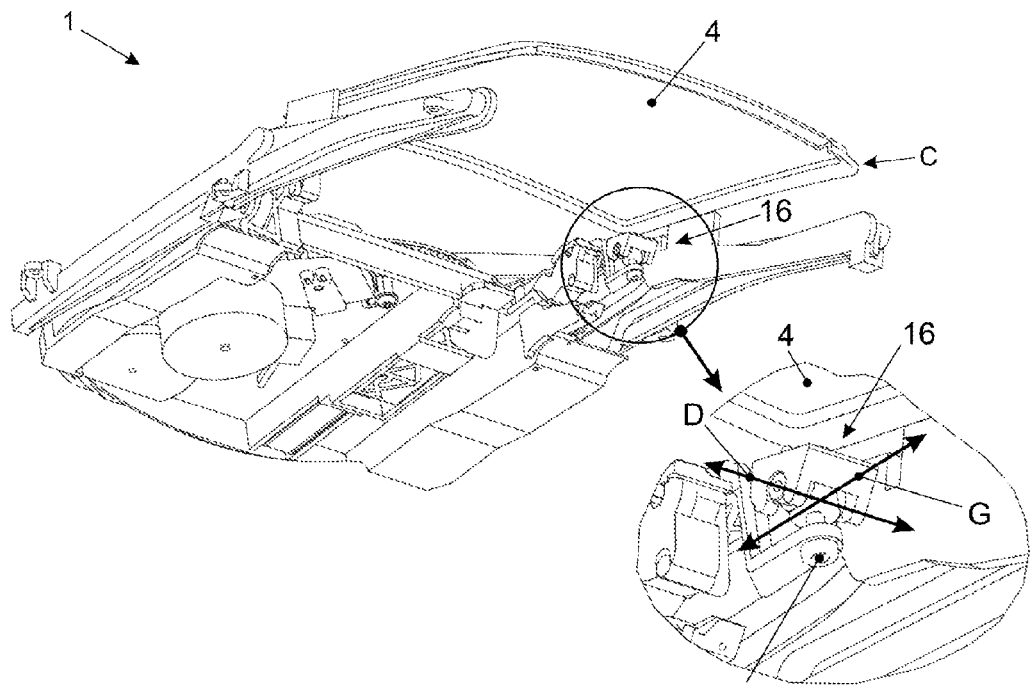
FIG. 12 is a bottom view of the HUD system of FIG. 1 with the cover in its closed position and comprises a detailed view of the cardan joint to connect the cover end of the main lever with the cover.

The pivot to connect the cover end 7 of the main lever 5 with the cover 4 is realized as cardan joint 16 shown in FIG. 12. FIG. 12 is a bottom view of the HUD system 1 of FIG. 1 with the cover 4 in its closed position C and shows a detailed view of the cardan joint 16. The cardan joint 16 enables that the cover end 7 of the main lever 5 is slidable in a slide direction D essentially vertical to the guiding direction G in relation to the cover 4. This ensures to avoid side forces causing friction between the curved guiding member 15 and the cover 4 and enables a smooth movement of the cover 4 without situations of jam.

Figure 15:
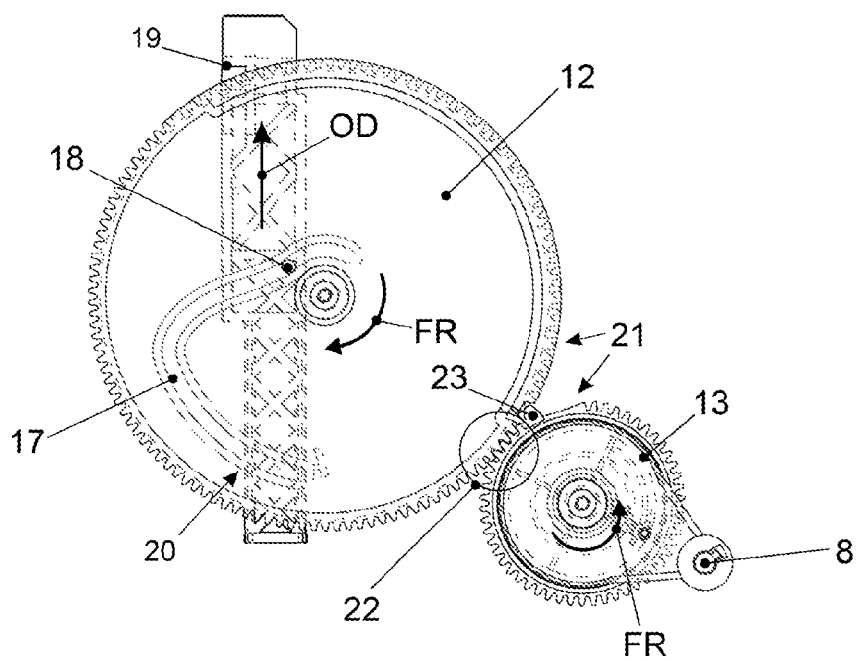
FIG. 15 is a detailed view of the motor driven gearwheel and the lever gearwheel of the HUD system of FIG. 14 that shows the further curved guiding member of the motor driven gearwheel.
Figure 16:
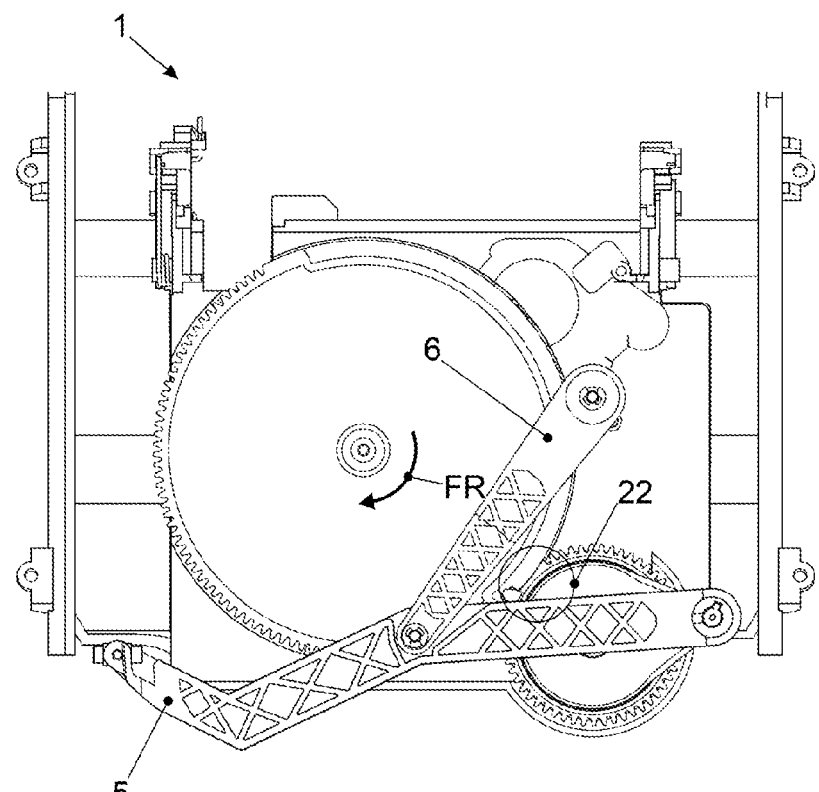
FIG. 16 is a top view of the HUD system with removed cover in its open position while the motor driven gearwheel and the lever gearwheel are not meshed.

The motor driven gearwheel 12 of the HUD system 1 comprises a further curved guiding member 17 on its end face to guide a driver pin 18 along a curve as shown in FIGS. 11 and 15 and 16. The driver pin 18 engages via a combiner lever 19 with the cover 4 to move the cover 4 around the combiner axis 14 between its operating position O and its storage position S. The further curved guiding member 17 comprises a degressive curve in an area 20 to enable self-locking of the combiner 4 in its operating position O. This design has the advantage that the combiner 4 is very robust fixed in its operating position O to avoid vibrations of the combiner 4 and distortions of the information projected on the combiner 4.

Figure 17:
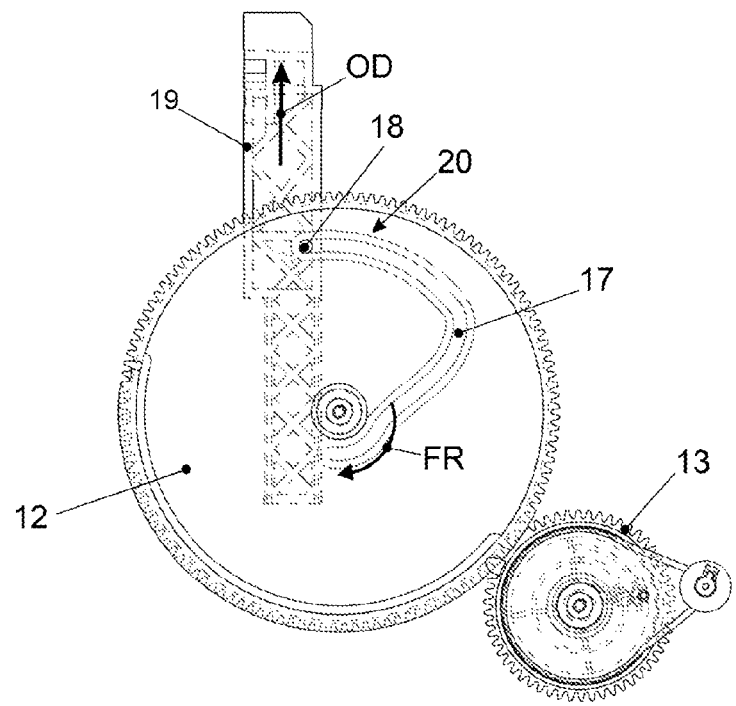
FIG. 17 is a detailed view of the motor driven gearwheel and the lever gearwheel of the HUD system of FIG. 16 that shows the further curved guiding member of the motor driven gearwheel.

The motor driven gearwheel 12 and the lever gearwheel 13 comprise an area 21 of their perimeter without meshing to disconnect the motor driven gearwheel 12 from the lever gearwheel 13 as shown in FIGS. 16 and 17. This enables the drive mechanism 2 to move the combiner 3 between its operating position O and its storage position S without moving the cover 4. This mechanism will be explained based on FIGS. 13 to 17.

Figure 13:
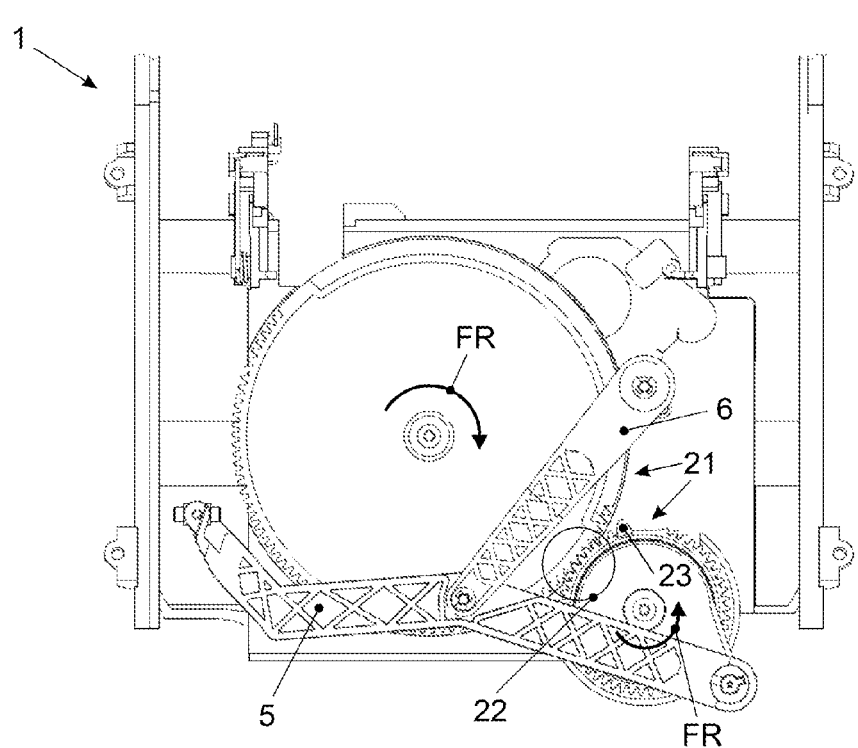
FIG. 13 is a top view of the HUD system with removed cover close to its open position with meshed motor driven gearwheel and the lever gearwheel.
Figure 14:
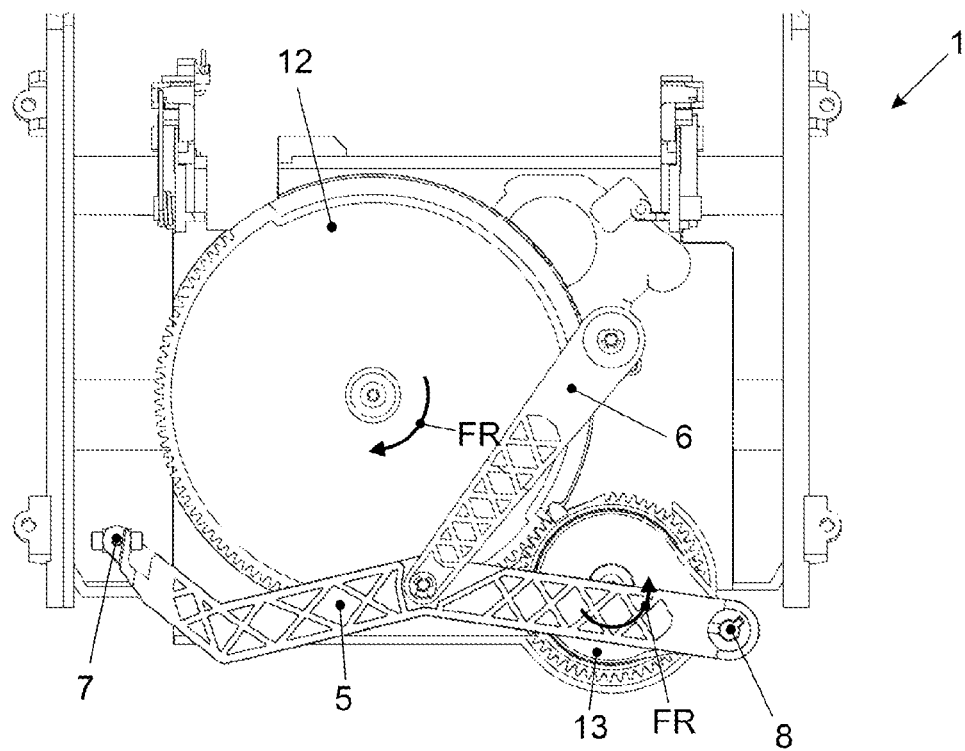
FIG. 14 is a top view of the HUD system with removed cover in its open position with still meshed motor driven gearwheel and the lever gearwheel.

FIG. 13 is a top view of the HUD system 1 with removed cover 4 close to its open position O with meshed motor driven gearwheel 12 and the lever gearwheel 13. The motor turns the motor driven gearwheel 12 in the first rotary direction FR to completely open the cover 4 and move the combiner 3 from its storage position S into its operating position O. The motor driven gearwheel 12 is meshed in an area 22 with lever gearwheel 13 and turns lever gearwheel 13 in its first rotary direction FR. In FIGS. 14 and 15 the cover end 7 of the main lever 5 reached its end position and the cover 4 its open position P while the area 21 of the perimeter of the motor driven gearwheel 12 and the lever gearwheel 13 without meshing is close to the area 22 where the motor driven gearwheel 12 and the lever gearwheel 13 still mesh.

FIG. 15 is a detailed view of the motor driven gearwheel 12 and the lever gearwheel 13 of the HUD system 1 of FIG. 14 that shows the further curved guiding member 17 of the motor driven gearwheel 12. While the motor driven gearwheel 12 turns in its first rotary direction FR the driver pin 18 fixed to the combiner lever 19 is guided along further curved guiding member 17 what results in a linear movement of the combiner lever 19 in its opening direction OD.

FIG. 16 is a top view of the HUD system 1 with removed cover 4 in its open position O while the motor driven gearwheel 12 and the lever gearwheel 13 are not meshed. The motor turned the motor driven gearwheel 12 further in its first rotary direction FR until the driver pin 18 reached the end of the further curved guiding member 17 and the combiner lever 19 pushed the combiner 3 into its operating position O as shown in FIGS. 4 and 17. This has the advantage that the driver mechanism 2 only needs a single motor to drive the cover 4 and the combiner 3 into their different positions.

To move the combiner 3 into its stored position S and the cover 4 into its closed position C the teeth of the motor driven gearwheel 12 and the lever gearwheel 13 need to be meshed again. The lever gearwheel 13 comprises one compared to the other teeth of the lever gearwheel 13 large tooth 23 as a first tooth at the end of the area 21 without teeth to enable smooth interconnection of the teeth of the lever gearwheel 13 with the teeth of the motor driven gearwheel 12 when connected again. This avoids a blocking situation of the gearwheels when connected again. In another embodiment the motor driven gearwheel 12 would comprise such a larger tooth to smoothen the interconnection of the teeth of the gearwheels. To move the combiner 3 into its stored position S and the cover 4 into its closed position C the motor turns the motor driven gearwheel 12 against the first rotary direction. The driver pin 18 moves along the further curved guiding member 17 what moves the combiner 3 from its operating position O into its stored position S. After that the motor driven gearwheel 12 and the lever gearwheel 13 mesh again and move the cover from its open position P into its closed position C.

The HUD system according to the invention discloses the concept of a single side cover drive mechanism with only one connection of the drive mechanism with the cover. In the embodiment disclosed in the figures the drive mechanism comprises only one main lever and only one support lever and the main lever pivoted with the cover end to the cover is the sole connection of the drive mechanism with the cover. A man skilled in the art based on the teaching of this concept of a single side cover drive mechanism to drive the cover on one side only without applying lateral (perpendicular) load on the guiding means will be able to come-up with other embodiments to realize this concept. This single side cover drive mechanism advantageously reduces the complexity of the HUD system and increases the reliability.

What is claimed is:

1. A head-up display system comprising:
a housing;
a combiner to display information in an operating position;
a sole cover to protect the combiner,
wherein the combiner is movable between the operating position and a storage position, and
wherein the sole cover is movable with an essential linear movement of the sole cover between an open position and a closed position to protect the combiner in its storage position with the sole cover in its closed position; and
a drive mechanism to move the sole cover between its open position and its closed position, which drive mechanism includes a sole connection with one corner of the sole cover.

2. A head-up display system according to claim 1, wherein the drive mechanism includes only one main lever and only one support lever and the main lever pivoted with a cover end to the sole cover is the sole connection of the drive mechanism with the sole cover.

3. The head-up display system according to claim 1, wherein the sole connection is formed by a cardan joint to connect a cover end of a main lever of the drive mechanism with the sole cover.

4. The head-up display system according to claim 3, wherein the main lever and a support lever of the drive mechanism are essentially in a parallel plane to the solve cover in its open position and its closed position.

5. The head-up display system according to claim 1, wherein the sole cover is slideable along a curved guiding member in a guiding direction between the open position and the closed position of the sole cover.

6. The head-up display system according to claim 5, wherein the sole connection to connect a main lever with the sole cover is slidable in essentially a direction perpendicular to a guiding direction.

7. The head-up display system according to claim 5, wherein the curved guiding member is built to lower the position of the sole cover at the beginning of the movement from the closed position to the open position and after that to move the sole cover in an essential linear movement.

8. The head-up display system according to claim 1, wherein a rotational drive mechanism includes a motor that drives a motor driven gearwheel meshing with a lever gearwheel which is pivoted with a driver end of the main lever.

9. The head-up display system according to claim 8, wherein the motor driven gearwheel and the lever gearwheel include an area of their perimeter without meshing to disconnect the motor driven gearwheel from the lever gearwheel to enable the drive mechanism to move the combiner between its operating position and its storage position without moving the sole cover.

10. The head-up display system according to claim 9, wherein the motor driven gearwheel includes a further curved guiding member on its end face to guide a driver pin along a curve which driver pin engages with the combiner to move the combiner between its operating position and its storage position.

11. The head-up display system according to claim 10, wherein the further curved guiding member includes a degressive curve to enable self-locking of the combiner in the operating position.

12. The head-up display system according to claim 6, wherein the sole connection to connect the main lever with the sole cover is slidable in essentially a direction (T) perpendicular to a direction (D) and the guiding direction.

13. The head-up display system according to claim 7, characterized in that the sole connection to connect a main lever with the sole cover is slidable in essentially a direction (T) perpendicular to a direction (D) and a guiding direction.

* * * * *